United States Patent [19]

Colliopoulos et al.

[11] Patent Number: 4,631,195
[45] Date of Patent: Dec. 23, 1986

[54] SWEETENING COMPOSITION

[76] Inventors: John A. Colliopoulos, 1114 Dobson, Evanston, Ill. 60202; James G. Young, 2729 Oak Ave., Northbrook, Ill. 60062; Josef H. Tsau, 876 Crimson Ct., Prospect Heights, Ill. 60070

[21] Appl. No.: 747,200

[22] Filed: Jun. 21, 1985

Related U.S. Application Data

[63] Continuation of Ser. No. 661,539, Oct. 16, 1984, which is a continuation of Ser. No. 395,423, Jul. 6, 1982, abandoned.

[51] Int. Cl.$^4$ .......................... A23L 1/22; A23L 1/236
[52] U.S. Cl. ..................................... 426/548; 426/658; 426/804; 426/549; 426/552; 426/496
[58] Field of Search ............... 426/548, 658, 804, 549, 426/552, 496

[56] References Cited

U.S. PATENT DOCUMENTS

| | | |
|---|---|---|
| 3,865,957 | 2/1975 | Schieweck et al. ................ 426/548 |
| 3,922,369 | 11/1975 | Glicksman et al. ................ 426/548 |
| 3,934,048 | 1/1976 | Furda et al. ........................ 426/548 |
| 3,971,857 | 7/1976 | Furda et al. ........................ 426/548 |
| 4,007,288 | 2/1977 | Glicksman et al. ................ 426/548 |
| 4,024,290 | 5/1977 | Layton ................................ 426/548 |
| 4,042,714 | 8/1977 | Torres ................................ 426/552 |
| 4,143,170 | 3/1979 | Finucane et al. .................. 426/548 |
| 4,254,154 | 3/1981 | Eisenstadt .......................... 426/548 |
| 4,292,336 | 9/1981 | Latymer ............................. 426/548 |
| 4,376,198 | 3/1983 | Dwivedi et al. ................... 426/548 |

Primary Examiner—Jeanette Hunter

[57] ABSTRACT

A composition and method for heat stabilizing dipeptide sweeteners for baking and cooking is described using a polyglucose or a polymaltose.

8 Claims, No Drawings

SWEETENING COMPOSITION

This application is a continuation of U.S. application Ser. No. 06/661,539 filed Oct. 16, 1984 which is a continuation of U.S. application Ser. No. 06/396,423 filed July 6, 1982, now abandoned.

BACKGROUND OF INVENTION (a) Field of the Invention

This invention relates to novel, heat-stable sweetening compositions and methods. In particular, this invention relates to a method for heat stabilizing dipeptide sweeteners which uses a polyglucose or a polymaltose. The invention also relates to a composition of a polyglucose or a polymaltose and a dipeptide sweetener, and to foodstuffs containing such a composition.

Dipeptide sweeteners are aspartyl-substituted phenylalanine compounds having many times the sweetening power of sucrose. They were discovered in the 1960's and have been developed as low calorie substitutes for sugar. They do not have a bitter aftertaste as is the case with certain artificial sweeteners.

The dipeptide sweeteners utilized in the practice of this invention are those of the type described and set forth in U.S. Pat. Nos. 3,475,403; 3,492,137; and 4,029,701, and U.S. Pat. No. 4,439,461 patented on March 27, 1984 entitled Dipeptide Sweetener Sulfate and Sulfonate Salts. In addition, several dipeptide sweetener complexes are described in U.S. Ser. No. 06/354,574 filed Mar. 4, 1982.

Despite the attractiveness of the use of these dipeptide sweeteners and their acid salts as sweeteners, they cannot be freely substituted in place of sugar for cooking or baking. It is well known that heating the free base and previously known salt forms of aspartame causes them to break down and lose their sweet taste. Consequently, they may not be useful in foodstuffs which require cooking or when mixed with food ingredients which are put through a heating process such as pasteurization.

(b) Prior Art

Dipeptide sweeteners are known in the art as described above. Polyglucose and polymaltose are described in U.S. Pat. Nos. 3,766,165 and 3,876,794. In addition, U.S. Pat. No. 3,971,857 describes a fast dissolving, low-hydroscopic, heat sensitive sweetening composition obtained by co-drying a solution of a dipeptide sweetener with a polyglucose in a ratio of 1:19 to 3:7 with a ratio of 1:3 to 1:4 being preferred, however, the patent teaches that care must be taken in drying the solution to prevent thermal decomposition.

SUMMARY OF THE INVENTION

It is therefore an object of this invention to develop a heat stable dipeptide sweetener composition and a method for using such composition in cooking and baking.

In accordance with this objective, it has been discovered that a combination of a dipeptide sweetener and a polyglucose or a polymaltose within a weight percent range from about 1:40 to about 1:200 will not undergo significant thermal decomposition of the dipeptide sweetener when used as a sweetener and bulking agent in cakes and other baked goods. In addition, cakes or other baked or cooked goods prepared in this manner have volume, textural quality and sweetness comparable to a sugar control.

The ratio of dipeptide sweetener to polydextrose may be fixed to a relative degree by agglomeration techniques such as fluid bed agglomeration or spray drying. (See eg. agglomerating, instantizing and spray drying, Food Technology, pg. 60–71, June (1975)) However, simple blending techniques will also be sufficient to practice the invention if the sweetener is sufficiently dispersed.

Polydextrose, as a commercial available preparation, is a polysaccharide (i.e. a polyglucose) with low calorie content (1 Kcal/g) and little or no sweetness. It primarily is used as a low-calorie, bulk replacement for sugar in foodstuffs. Polydextrose is a partially metabolizeable, water-soluble polymer prepared by the condensation of a melt which consists of approximately 89% D-glucose, 10% sorbitol and 1% citric acid on a weight basis. Polydextrose may be partially neutralized with potassium hydroxide.

Preferred dipeptide sweeteners are the alkyl esters of α-L-aspartyl-L-phenylalanine, particularly the methyl ester, (aspartame or APM), its salts and metal complexes thereof. Aspartame sulfate and organosulfonate salts are particularly useful because of their inherent heat stability thus increasing the thermal protection provided. These sulfate and organosulfonate salts may be prepared in a highly polar solvent containing the appropriate acid for salt formation. The dipeptide sweetener-metal complexes useful in the practice of the invention may be represented by the following formula:

[dipeptide sweetener]. $pM^{m+}$. $sQ^{t-}$ wherein m and t are integers of from one to three, either the same or different; wherein p is the ratio of $M^{m+}$ to the dipeptide sweetener which may be from 0.1 to 3; wherein S is the ratio of $Q^{t-}$ to the dipeptide sweetener and wherein $p \times m = s \times t$; wherein $M^{m+}$ is a pharmacologically acceptable metal ion or a combination of pharmacologically acceptable metal ions; and wherein $Q^{t-}$ is a pharmacologically acceptable anion or a combination of anions. These complexes are formed by cogrinding APM with appropriate metal salts in an alcoholic solution and drying.

Polyglucose and polymaltose refer to polymeric materials in which the majority of the monomeric moieties are glucose, maltose or other saccharide as well as polymeric materials in which the glucose, maltose or saccharide moieties are esterified with moieties derived from polycarboxylic acids used as polymerization activators. The acids used as polymerization activators catalysts, or cross-linking agents may be any one of a series of relatively non-volatile, edible, organic polycarboxylic acids. In particular, it is preferred to use citric, fumaric, tartaric, succinic, adipic, itaconic or terephthalic acids. The anhydrides of succinic, adipic, and itaconic acids may also be used. The acid or anhydride must be acceptable for use in food; that is, palatable and free of significant adverse effect at the level of ordinary use. The acid selected should be relatively nonvolatile, since more volatile acids may be vaporized during the heating and melting processes by which the mixture is polymerized. The polycarboxylic acids used are largely, but incompletely, esterfied with the polyglucose or polymaltose in the polymerizing process, forming acid polyglucose esters or acid polymaltose esters. This is evidenced by the residual acidity of the polyglucoses and polymaltoses after dialysis, and the recovery of the acid upon hydrolysis of the product. The incorporation of the acid moieties within the polyglucoses or polymaltoses does not affect their suitability for human consumption. Inedible acids, while chemically suitable to the process, are not suitable for use in the production of edible polyglucoses or polymaltoses. Therefore, the selection of the acid catalyst to be used must be guided by the human safety and the lack of significant toxicity. Inorganic acids are not suitable for use as acid catalysts in anhydrous melt polymerization since they will not serve as cross-linking agents in the production of the insoluble polyglucoses and polymaltoses. Similarly, monocarboxylic acids will catalyze polymerization but will not be as effective as cross-linking agents.

An insoluble polyglucose or polymaltose polymer of the type used in the invention likely contains cross-linking polycarboxylic acid ester moieties between different polyglucose or polymaltose molecules. For the soluble polymers used in the invention, each acid moiety is more likely to be esterified with only one polymer molecule. Most of the polyglucoses produces in this invention have an average molecular weight from about 1,500 to about 36,000. The soluble polyglucoses have been found to have an average molecular weight from about 1,500 to about 18,000 and the insoluble polyglucoses used in this invention have been found to have an average molecular weight of between about 6,000 and about 36,000. The molecular weight of the polyglucoses are usually found to range from about 1,000 to about 24,000 with most of the molecular weights falling in the range from 4,000 to about 12,000.

The linkages which predominate in the polyglucoses are primarily 1→6 but other linkages also occur. In the soluble polyglucoses each of the acid moieties is esterified to polyglucose. Where the acid moiety is esterified to more than one polyglucose moiety, cross-linking results.

The polyglucoses and polymaltoses are useful for imparting the physical properties of sugar, other than sweetness, the dietetic foods from which sugar has been removed and/or replaced by artificial or other sweeteners. In baked goods, for example, the polyglucoses and polymaltoses affect rheology and texture in a manner analogous to sugar and can replace sugar as a bulking agent. Typical uses for the soluble polyglucoses are found in low calorie jellies, jams, preserves, marmalades, and fruit butters; in dietetic frozen food compositions including ice cream, iced milk, sherbet and water ices; in baked goods such as cakes, cookies, pastries and other foodstuffs containing wheat or other flour; in icings, candy and chewing gum; in beverages such as non-alcoholic soft drinks and root extracts; in syrups; in toppings, sauces and puddings; in salad dressings and as bulking agents.

Polydextrose, as commercially approved for food use, is composed almost entirely of randomly cross-linked glucose polymers with all types of glucosidic bonds, the 1-6 bond predominantly (Food Tech. July '81, pp. 44-49) and it contains some sorbitol end group and monoester bonds with citric acid. Along with the polymer itself, there are small amounts of residual raw materials (glucose, sorbitol and citric acid). The chemical structure of the commercially available polydextrose is:

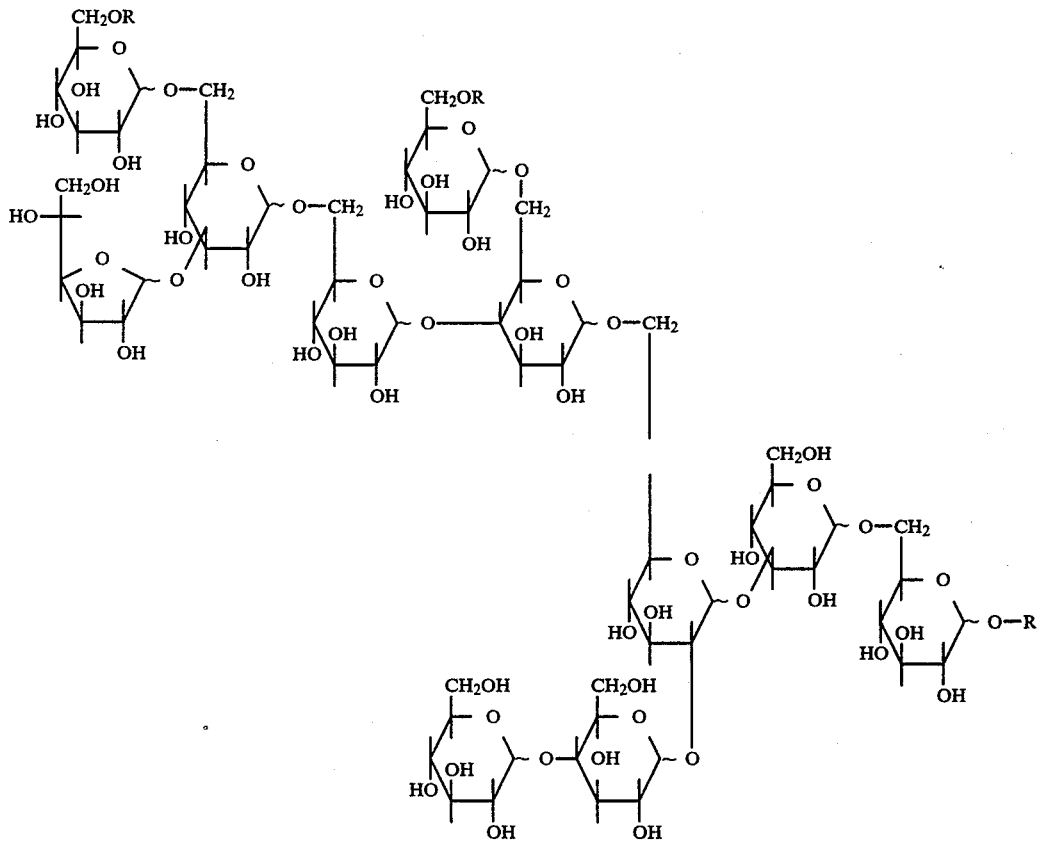

R=hydrogen, glucose, sorbitol, citric acid, or polydextrose

The structure of this one form of a polydextrose may help explain what is believed to be the mechanism. A first possibility is that the cross-linking agent, for example, citric acid, is a binding site for the dipeptide sweetener. Under normal conditions, a dipeptide sweetener salt, such as the citric acid APM salt, would prove thermally unstable, the anionic portion of the molecule tending rapidly to cause cyclization. However, if the dipeptide sweetener is bound to citric acid portion of polydextrose, the anionic portion of the molecule is bound to the polymer and therefore cyclization becomes more difficult. Another possibility can be seen in the branched chain configuration of polydextrose. The numerous pockets formed on the structure provide sites for encapsulation. The dipeptide sweetener would "fit" into the sites and be held by hydrogen bonding. It is apparent then that other branched chain polysaccharides or other compounds with anionic bound polymeric binding sites would also be suitable for the practice of this invention. The complexes of the invention are of particular importance in that they appear to "fit" together into the structure possibly explaining their increase in thermal stability when compared with other dipeptide sweeteners.

It has been determined that the thermal protection only occurs, practically, within a defined range. Between a dipeptide sweetener/polydextrose ratio of about 1:40 to about 1:200 the dipeptide sweetener remains significantly sweet and acceptable for cooking and baking. Below the range the sweetness diminishes significantly and the ratio of dipeptide sweetener to polydextrose ratio is too great to provide both sweetness and bulk for cooking and baking purposes. Above the range the sweetness also is diminished. In addition, not enough sweetener would be in the mixture in proportion to the polydextrose to make it a practical sweetener for cooking and baking purposes. A preferred range of dipeptide sweetener to polydextrose is from about 1:80 to about 1:160.

The composition of this invention may then be incorporated into baked and cooked goods as a substitute for high volume sweetening agents, flour, etc., thus reducing significantly the amount of calories and retaining sweetness without thermal decomposition of the dipeptide sweetener.

The following examples further illustrate details for the preparation and use of the thermally stable dipeptide sweetener composition. The invention, which is fully set forth in the foregoing disclosure, is not to be construed as being limited either in spirit or scope by these examples. Those skilled in the art will readily understand that known variations and the conditions and processes of the following are possible.

DESCRIPTION OF THE PREFERRED EMBODIMENTS

The following examples all use commercially available polydextrose as approved for food use in 21CFR Part 172, Federal Register, Vol. 46, No. 108:

EXAMPLE 1

Agglomerated APM/Polydextrose

Using a Waring blender 0.324 Kg of APM was milled with 1.4 Kg of maltodextrin with a DE ratio of 10% w/w (Maltrin M-100) and agglomerated according to the following procedure: 33.271 Kg of polydextrose was placed in a Freund agglomerator and agglomerated using the maltodextrin as binder.

EXAMPLE 2

Yellow cake with APM

A yellow cake was baked, using the following ingredients, at 350±20° F. for 40 min. All ingredients are placed in a Kitchenaid mixer and mixed until fairly homogeneous.

| Flour | 154.4 g |
|---|---|
| APM | 1.93 g |
| Maltrin M-100 | 104.2 g |
| Baking Powder | 6.83 g |
| Salt | 3.42 g |
| Milk | 193.64 g |
| Shortening | 55.6 g |
| Eggs | 54.2 g |
| Vanilla | 3.13 g |
| Total | 577.35 g |

The recovery of APM in the control cake was 11% and on tasting the cake had no perceptible sweet taste. APM content was analyzed by high performance liquid chromatography as follows.

The high performance liquid chromatography (HPLC) analysis was conducted using standard techniques and an analytical HPLC system manufactured by Waters Associates, Milford, Mass. The column was a Dupont Zorbax C-8 (trademark of E. I. Dupont, Inc., Wilmington, Del.) column measuring 15 cm by 4.6 mm i.d. The mobile phase was a mixture of acetonitrile, tetrahydrofuran, and 0.05M aqueous sodium phosphate at a ratio of 4:1:45. UV detection of product was measured at 210 nm. The flow rate was 2 ml per min and the injection volume was 10 microl. Typical retention times are aspartylphenylalanine methyl ester (APM) 4.3 min; diketopiperazine (DKP) 2.2 min; aspartylphenylalanine (AP) 1.5 min. DKP and AP are degradation products typically found as impurities in APM.

EXAMPLE 3

Yellow cake with agglomerated APM/polydextrose

A yellow cake was prepared using 127.5 g of the agglomerated product of Example 1 and the following ingredients baked at 350±20° F. for 40 min. All ingredients were placed in a Kitchenaid mixer and mixed until fairly homogeneous.

| Flour | 137.5 g |
|---|---|
| Baking Powder | 6.5 g |
| Salt | 3.3 g |
| Milk | 183.0 g |
| Shortening | 74.7 g |
| Eggs | 54.0 g |
| Vanilla | 4.0 g |
| Total | 590.5 g |

The recovery of APM in the cake was 71% using HPLC and the cake had a perceptible sweet taste.

EXAMPLE 4

Yellow cake with wet blend APM/polydextrose

A cake was baked according to Example 3 except the APM/polydextrose was wet blended with the milk before incorporation into the mixture. Recovery of APM after baking was 71% by HPLC.

EXAMPLE 5

Cakes were baked according to Examples 2 and 3 except the Ca complex was used without agglomeration with polydextrose with the following results by HPLC.

| | |
|---|---|
| APM - CaCl$_2$ complex/polydextrose | 69% |
| APM - CaCl$_2$ complex/no polydextrose | 50% |

EXAMPLE 6

Chocolate cake

Chocolate cakes were prepared according to Example 4 except that appropriate chocolate flavoring and (APM+)$_2$SO$_4$ were used with the following results:

| | |
|---|---|
| (APM+)$_2$SO$_4$/polydextrose | 44% APM |
| (APM+)$_2$SO$_4$/no polydextrose | 11% APM |

EXAMPLE 7

Yellow Cake outside acceptable range

A cake was prepared according to Example 2 except that the ratio of polydextrose to APM was 20:1. The recovery of APM was 13.6% by HPLC and the cake was not perceptible sweet. A control cake with no polydextrose yielded 11% APM by HPLC.

EXAMPLE 8

Wet treatment

One gram of APM was ground and mixed well with 50.0 g of polydextrose, 25.0 ml of alcohol was added and mixed well to a viscous mass. The mass was then dried in a vacuum at 60±5° C. for 2 hours and the dry mass ground to a fine powder.

The fine powder was heated at 145±5° C. for 25 minutes and then analyzed for APM by HPLC resulting in 23% degredation versus 67% degredation using the agglomerated product of Example 1.

EXAMPLE 9

Syrups were prepared with 40 mg APM, 4.75 g of polydextrose, 0.25 g of Maltrin 100 and 2.1 g of water or dilute KOH solutions to bring the pH up from 2.9 to 5.4. A second set of samples contained 40 mg APM, 5.0 g Maltrin 100, from 100 mg to 400 mg citric acid, and 2.1 g of water. Samples were heated at 145±5° C. for 25 minutes and analytical results are summarized below.

| | Sample Composition (mg) | | | | Analysis of |
|---|---|---|---|---|---|
| APM | Poly-dextrose | Maltrin 100 | Citric acid | pH | Heated sample APM (% theory) |
| 40.0 | 4750 | 250 | — | 2.9 | 75 |
| 40.0 | 4750 | 250 | — | 3.7 | 67 |
| 40.0 | 4750 | 250 | — | 4.7 | 56 |
| 40.0 | 4750 | 250 | — | 5.4 | 40 |
| 40.7 | — | 5000 | — | 4.7 | 77 |
| 42.0 | — | 5000 | 100 | 2.6 | 41 |
| 40.9 | — | 5000 | 202 | 2.3 | 24 |
| 41.0 | — | 5000 | 401 | 2.0 | 13 |

What is claimed is:

1. A heat stable sweetening composition comprising the combination of a dipeptide sweetener and a polyglucose or a polymaltose in a ratio of from about 1:40 to about 1:200.

2. A composition according to claim 1 wherein the depeptide sweetener is aspartame, its salts or its complexes.

3. A composition according to claim 1 wherein the polyglucose comprises about 89 weight percent D-glucose, about 10 weight percent sorbitol and about 1 weight percent citric acid.

4. A composition according to claim 1 wherein the combination comprises agglomerated dipeptide sweetener and a polyglucose or polydextrose.

5. A composition according to claim 2 wherein the aspartame to polyglucose or polymaltose ratio is about 1:80 to about 1:160.

6. An improved cooked or baked foodstuff comprising a high caloric sweetener, flour or other starchy material wherein the improvement comprises replacing all or part of the high caloric sweetener, flour or other starchy material with a composition comprising a dipeptide sweetener and a polyglucose or polymaltose in a ratio of from about 1:40 to about 1:200.

7. A composition according to claim 6 wherein the aspartame to polyglucose or polymaltose ratio is from about 1:80 to about 1:160.

8. A low caloric cooked or baked foodstuff according to claim 2 containing a polyglucose comprising about 89 weight percent D-glucose, about 10 weight percent sorbitol and about 1 weight percent citric acid.

* * * * *